United States Patent
Boulos et al.

(10) Patent No.: US 12,425,306 B2
(45) Date of Patent: Sep. 23, 2025

(54) INTERLOCKED MULTI-DOMAIN TOPOLOGY MODEL FOR DYNAMIC xNF ORCHESTRATION

(71) Applicant: Ciena Corporation, Hanover, MD (US)

(72) Inventors: Logaina Boulos, Saint Laurent (CA); Fadi Bishay, Laval (CA); Julien Perron, Saint-Jean-sur-Richelieu (CA); Hesham Sedky, Vaudreuil Dorion (CA)

(73) Assignee: Ciena Corporation, Hanover, MD (US)

( * ) Notice: Subject to any disclaimer, the term of this patent is extended or adjusted under 35 U.S.C. 154(b) by 195 days.

(21) Appl. No.: 18/347,771

(22) Filed: Jul. 6, 2023

(65) Prior Publication Data

US 2025/0016054 A1  Jan. 9, 2025

(51) Int. Cl.
*G06F 13/00* (2006.01)
*H04L 41/0806* (2022.01)
*H04L 41/0895* (2022.01)
*H04L 41/5009* (2022.01)

(52) U.S. Cl.
CPC ...... *H04L 41/0895* (2022.05); *H04L 41/0806* (2013.01); *H04L 41/5009* (2013.01)

(58) Field of Classification Search
CPC ............. H04L 41/0895; H04L 41/0806; H04L 41/5009; H04L 41/0894; H04W 28/24; H04W 28/16; H04W 28/00
USPC ................................. 709/222, 220, 201, 223
See application file for complete search history.

(56) References Cited

U.S. PATENT DOCUMENTS

| | | | |
|---|---|---|---|
| 8,275,940 B2 | 9/2012 | Lecoq et al. | |
| 8,477,142 B2 | 7/2013 | Dufourd et al. | |
| 11,115,271 B1* | 9/2021 | Schmelz | H04L 41/0813 |
| 11,184,234 B2 | 11/2021 | Mahdi et al. | |
| 11,540,139 B2 | 12/2022 | Bishay et al. | |
| 2008/0256556 A1 | 10/2008 | Dufourd et al. | |
| 2021/0306215 A1* | 9/2021 | Schmelz | H04L 41/0813 |
| 2022/0261686 A1 | 8/2022 | Frankel et al. | |
| 2023/0254223 A1* | 8/2023 | Boulos | H04W 24/02 370/328 |
| 2024/0223256 A1* | 7/2024 | Thalanany | H04W 72/0457 |

* cited by examiner

*Primary Examiner* — Kenneth R Coulter
(74) *Attorney, Agent, or Firm* — Baratta Law PLLC; Lawrence A. Baratta, Jr.

(57) ABSTRACT

Systems and methods for utilizing a multi-domain topology model for dynamic orchestration of network functions include managing an information model of a network that includes a mobile access network, one or more data centers, and a transport network interconnecting the mobile access network and the one or more data centers; receiving a request for a network slice in the network with the network slice having one or more Key Performance Indicators (KPIs); utilizing the information model to determine one or more of whether the network can support the network slice with the one or more KPIs and where to place one or more Network Functions (xNF) associated with the network slice; and providing a result of the one or more of whether the network can support the network slice with the one or more KPIs and where to place one or more xNFs associated with the network slice.

20 Claims, 4 Drawing Sheets

INTERLOCKED MULTI-DOMAIN TOPOLOGY MODEL FOR DYNAMIC xNF ORCHESTRATION

FIELD OF THE DISCLOSURE

The present disclosure relates generally to networking and computing. More particularly, the present disclosure relates to systems and methods for utilizing an Interlocked Multi-Domain Topology Model for Dynamic Network Function (xNF) Orchestration.

BACKGROUND OF THE DISCLOSURE 5G stands for the fifth-generation technology standard for cellular networks. 5G is a service-oriented approach that allows the delivery of virtual networks over the same physical mobile network. It is about deploying, managing, and enabling new innovative service offerings in a timely, highly cost-effective manner without compromising the quality of service (QOS) or experience of customers. 5G networks require automated and orchestrated management from a service provisioning perspective. Orchestration requires multi-domain and multi-vendor management support. As such, it is essential for the dynamic placement of Network Functions. This dynamic nature of a mobile network and the need to guarantee QoS of slice-based services creates management complexity. Conventionally, the assumption is all Network Function are statically pre-instantiated where service providers rely on resource horizontal scaling to overcome peak periods. This can increase costs and does not cover the unpredictability and rapidly changing demands of the current networks.

BRIEF SUMMARY OF THE DISCLOSURE

The present disclosure relates to systems and methods for utilizing a multi-domain topology model for dynamic orchestration of network functions. The present disclosure provides a strong orchestration system that enables multi-vendor, end-to-end orchestration across all 5G domains, Radio Access Network (RAN), Core, and Transport and additionally is adaptive, service and slice aware as well as conscious of the underlying network topology. All these expectations make it challenging for service providers and operators to provide a single solution able to overcome all these hurdles. Instead, service providers tend to focus on one or a subset of these challenges only. The present disclosure provides a multi-domain topology model that can be utilized to provide a single solution for an orchestration system.

An information model is presented herein that, through its abstraction and normalization, brings together five domains that are natively unaware of each other. Traditionally, these five domains were all serviced by separate information models, and we have determined a unified model enabling seamless interaction. Beyond just the simple point of inter-domain awareness, the information model includes a precise and meticulous design of touchpoint between the entities of the different domains. These are the characteristics that make traversing the entities of this information model optimal and smooth. Accordingly, the information model can be used for Network Function placement across 5GC, RAN, and Edge applications, and is optimized, multi-site, intent- and policy-based and is well tailored to operate in a closed-loop environment. This information model introduces a single point of reference that encapsulates and maintains all the capabilities and required information from various data sources to serve as an apparatus for several network slicing related applications including, but not limited to, enable a diversity of Placement algorithms with multitude of constraints that can be used to achieve optimal location selection. It is also able to support Service Qualification, Feasibility and Capacity analysis as well as Service Assurance.

In various embodiments, the present disclosure includes utilizing a multi-domain topology model for dynamic orchestration of network functions. This can be realized as a method having steps, a processing device configured to implement the steps, and as a non-transitory computer-readable medium with instructions that, when executed, cause one or more processors to perform the steps. The steps include managing an information model of a network that includes a mobile access network, one or more data centers, and a transport network interconnecting the mobile access network and the one or more data centers; receiving a request for a network slice in the network with the network slice having one or more Key Performance Indicators (KPIs); utilizing the information model to determine one or more of whether the network can support the network slice with the one or more KPIs and where to place one or more Network Functions (xNF) associated with the network slice; and providing a result of the one or more of whether the network can support the network slice with the one or more KPIs and where to place one or more xNFs associated with the network slice.

The managing the information model can include obtaining data from the mobile access network, the one or more data centers, and the transport network, including vendor information associated with each; obtaining policy configuration that defines rules for network slices; and incorporating a subset of the data and the policy configuration into the information model, wherein the subset includes the data required to support xNF instantiation and placement. The incorporating can include abstracting and normalizing the subset of the data into the information model. The subset can include minimal required data to support the xNF instantiation and placement, such that the information model is a unified model across the mobile access network, the one or more data centers, and the transport network. The policy configuration can include which types of xNFs the one or more data centers support and shareability of the xNFs between users.

The steps can further include causing zero touch orchestration of the network slice based on the result. The information model can include a plurality of entities for the mobile access network, the one or more data centers, and the transport network, and an entity each for vendor information and for policy configuration, and wherein the information model includes defined relationships between each of the entities. The information model can include interlocking between entities of the plurality of entities for the one or more data centers and entities of the plurality of entities for the mobile access network, the transport network, the vendor information, and the policy configuration. The information model for the mobile access network can include Coverage Area, Cell, and Tracking Area, and wherein the information model supports an orderable area of service to a granularity of a cell site. The information model can include Coverage Area which is recursively decomposed to model an area of the mobile access network.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
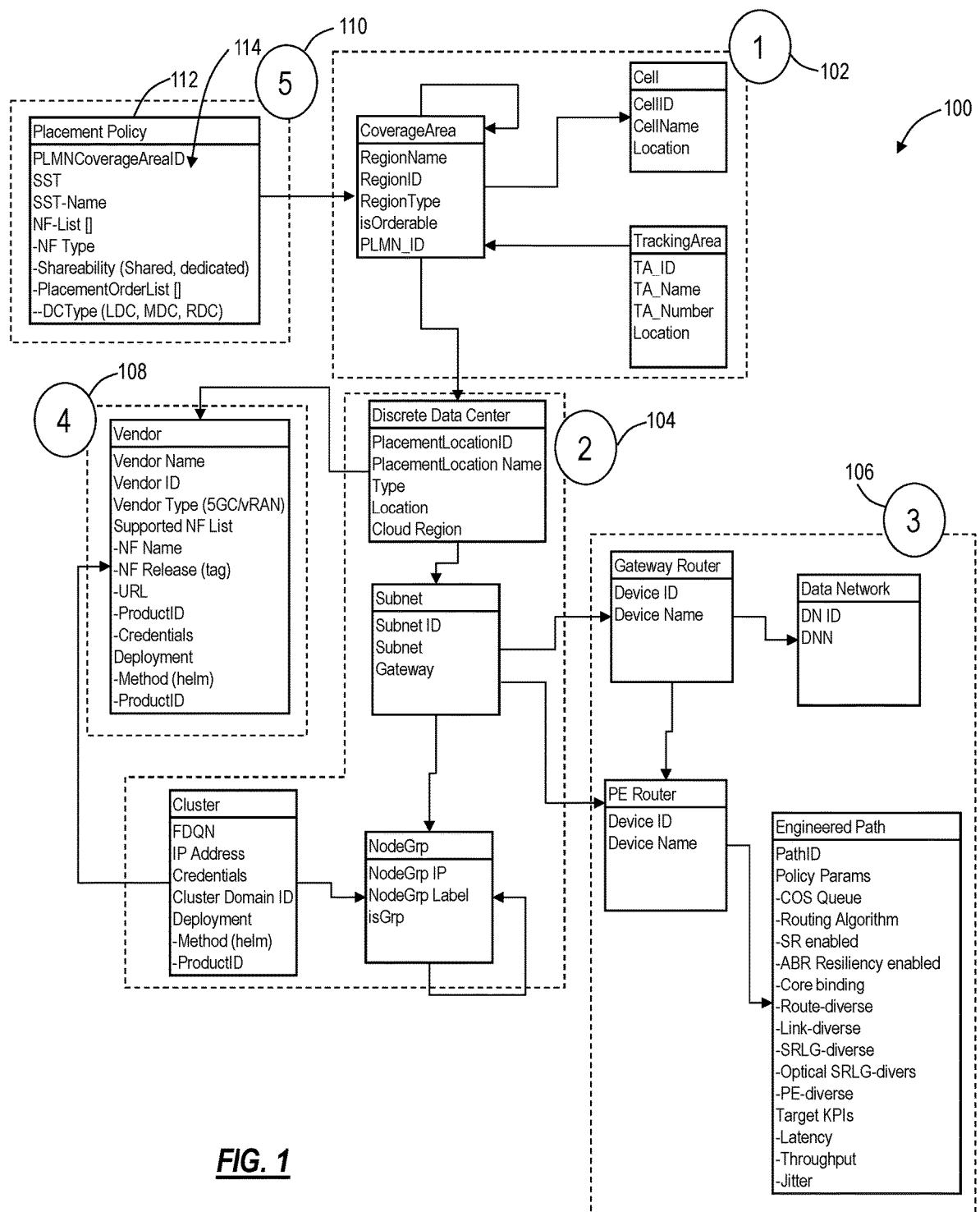
FIG. 1 is a diagram of a logical representation of an information model.

Again, the present disclosure relates to systems and methods for utilizing a multi-domain topology model for dynamic orchestration of network functions.

Definitions

Information model—in computing, an information model defines a representation of data, relationships between the data, constraints, rules, and operations. In the present disclosure, the information model is a representation of data related to a 5G network for purposes of orchestration network functions.

Network function—a network function (xNF) is a functional building block within the 5G network, which has well-defined external interfaces and a well-defined functional behavior. In an example embodiment, the network function can be a software or virtual network function (VNF) that is instantiated in a data center. Further, a given network function can be located at different locations in the 5G network. The present disclosure addresses the question of where to locate a given network function considering various parameters, e.g., network slicing Key Performance Indicators (KPIs), network function capabilities, etc.

Network Slice—in 5G, a network slice is a multiplexing of virtualized and independent logical networks on the same physical network infrastructure. That is, each network slice is an isolated end-to-end network tailored to fulfil diverse requirements (KPIs) requested by a particular application and user.

Domain—while the term domain has broad meaning in networking, the present disclosure utilizes the term domain to mean a particular aspect of the 5G network such as the Radio Access Network (RAN), cloud resources, transport resources, network function resources, etc. That is, each domain is a partition of the 5G network for purposes of configuring, orchestrating, and delivering a network slice. In the information model, the domains are the (1) mobile network (i.e., the RAN), (2) data centers, (3) transport network (i.e., optical and packet), (4) vendor information, and (5) policy configuration.

Zero touch—zero touch is a technique of provisioning which eliminates operator involvement. The present disclosure utilizes the information model to determine feasibility and configuration details to orchestrate the slice. The configuration details include NE configurations, xNF deployment, etc. and orchestration can be based on different controllers.

5G Networks and Network Function Placement

Again, 5G is a service-oriented approach that allows the delivery of virtual networks over the same physical mobile network. It is about deploying, managing, and enabling new innovative service offerings in a timely, highly cost-effective manner without compromising the quality of service (QOS) or experience of customers. 5G networks will have to be managed in an automated and orchestrated manner from a service provisioning perspective. Orchestration requires multi-domain and multi-vendor management support.

Essential to the success of 5G Networks, Network Function (xNF) placement has a distinguished role to play. The need to guarantee QoS based on network slicing Key Performance Indicators (KPIs) (e.g., latency, jitter, throughput (bandwidth), etc.) makes optimizing xNF placement important. However, optimization of network resource allocation and xNF placement in a dynamically changing environment is a major challenge. It requires operators to provide guarantees around QoS measures across the different network slices, while managing multiple end-to-end slices across diverse infrastructures.

xNF Placement has proven to be exceptionally complex due to the following aspects:

(1) Model misalignment: data needed to perform proper placement is distributed across multiple systems, where each system is exposing models that reflect the context of its domain (RAN, Cloud, Transport, Vendor's xNF, etc.). For example, a data center region/zone association to a RAN Coverage Area are both locations, but location in different domains can mean different things based on the particular domain. Here, the data center region/zone association may be a single location, e.g., data center X, whereas the RAN coverage area may be a larger location, e.g., city of Y.

(2) Lack of standardization: unnormalized data between different vendors of the same domain. For example, cloud providers such as Azure and Amazon Web Services (AWS) have different models.

(3) Data Overload: A system model persists and exposes data to a service with very domain specific features. Without synthesizing and streamlining the data, no multi-domain/multi-vendor business logic can be achieved to solve placement's resource orchestration generically. For example, we do not need the full path computation result for each Traffic Engineering (TE) Path proposed by a Software Defined Network (SDN) controller.

Information Model

To overcome this complexity and to support a differentiated, slice-based service architecture, the present disclosure provides the information model as a building block for autonomous xNF placement. Specifically, the information model is abstracted, normalized, and centralized to contain all the essential pieces from all different data sources, maintained together and linked with one another. The result is a key enabler for effective, dynamic NF placement.

A vendor topology model is an information model configured to support resource orchestration tailored for 5G Network Function placement. A Placement, Feasibility, Qualification or Capacity service can utilize the Vendor Topology information to achieve dynamic slicing, allowing optimal placement of xNFs (i.e., in the data centers) and transport connectivity between the xNFs.

FIG. 1 is a diagram of a logical representation of an information model 100. The information model 100 brings data from five different domains 102, 104, 106, 108, 110 together for purposes of determining whether an xNF can be placed in a particular location to support given policy considerations. The five different domains include the (1) mobile network 102 (i.e., the RAN), (2) data centers 104, (3) transport network 106 (i.e., optical and packet), (4) vendor information 108, and (5) policy configuration 110. The information model 100 abstracts the minimal necessary set of data from the various domains 102, 104, 106, 108, 110 and data sources and interconnects them together in one unified model.

To create the information model 100, we took the following steps:
(1) Identify all of the domains 102, 104, 106, 108, 110 that are relevant to make a decision for xNF placement,
(2) With the data from every domain 102, 104, 106, 108, 110, synthesize the data to achieve normalization between technology and vendors, i.e., normalization means the data is in a unified format independent of technology and/or vendor,
(3) Reduce the data to the minimal required entities that are necessary to answer the question, which is resource orchestration and xNF placement, and where an entity is a type of data from the domains 102, 104, 106, 108, 110, and
(4) Interconnect the different entities to allow a handoff between two domains to achieve a final, optimal result to whatever algorithm we want to apply on the information model 100. Note, when we use the term "optimal," we do not necessarily mean the absolute best, but rather some solution or result that has some improvement.

Each domain 102, 104, 106, 108, 110 is abstracted based on:
(1) Normalizing the entities between the different technologies and different vendors,
(2) Minimalizing the information model 100 to the entities that serve only the intended purpose, and
(3) Interlocking them together to be able to find a resolution to the problem.

So, the information model 100 is a vendor topology model explained that provides the building block to support intelligent and intent-based placement for network functions. It provides a set of key features that together are capable of providing the foundation for zero-touch orchestration. The present disclosure with the information model 100 has the following characteristics:

Vendor agnostic: The vendor entity of the information model 100 provides all the needed data to describe how a vendor operates, what Network functions it supports, which deployment method it uses. The relationship to the cluster and the Data Center will scope the range where this vendor's xNFs will be deployed.

Deployment agnostic: Deploying a xNF can use multiple techniques (e.g., Helm which is a package manager for Kubernetes). Using the information model 100, it is clear how each xNF can be deployed and is provided by which vendor and can be deployed on any cluster/Data Center (DC).

Infrastructure agnostic: Whether Data Centers are on-premises or in the cloud, this will be captured in the model in the Discrete DC type and the xNF placement algorithms will be abstracted from that detail.

Location agnostic: Where xNF will be deployed will be up to the algorithm to decide. All what the user needs to provide is the coverage area of the requested service. The rest will be dynamically allocated.

Technology agnostic: Here again for the transport network, which Layer 3 (L3) Networking technology is used is something that will be maintained in the model and any solution will only need to rely on the data in this model to resolve the needed L3 technology and its specific parameters.

Domains

Again, the five different domains include the (1) mobile network 102 (i.e., the RAN), (2) data centers 104, (3) transport network 106 (i.e., optical and packet), (4) vendor information 108, and (5) policy configuration 110.

FIG. 1 is a logical representation of the information model 100 showing the five different domains 102, 104, 106, 108, 110 along with data entities 112 and corresponding data 114. In FIG. 1, the entities 112 are labels describing the data 114.

The mobile network 102 includes entities 112 of coverage area, tracking area, and cell. Coverage Areas represent geographical areas. They are modeled recursively to support the containment hierarchy. Coverage Area can have the following pre-set levels: Public Land Mobile Network (PLMN), Region, Metro, Zone, Subzone. The topmost CA (Coverage Area) is always of type PLMN and represents an operator network. The following 3 levels (region, metro, zone) are user defined and intended to decompose the operator's network into smaller addressable geographical areas. At the bottom of this hierarchy, the Sub Zone, which is intended to provide a coverage equal or smaller to a single Tracking Area, hence a Subzone coverage area can have a relationship to maximum one tracking area. Such decomposition makes the Sub Zone the only Coverage Area that can depict a cellular base station where a Next Generation Node B (gNB) or a Distributed Unit (DU) is deployed.

Figure 2:
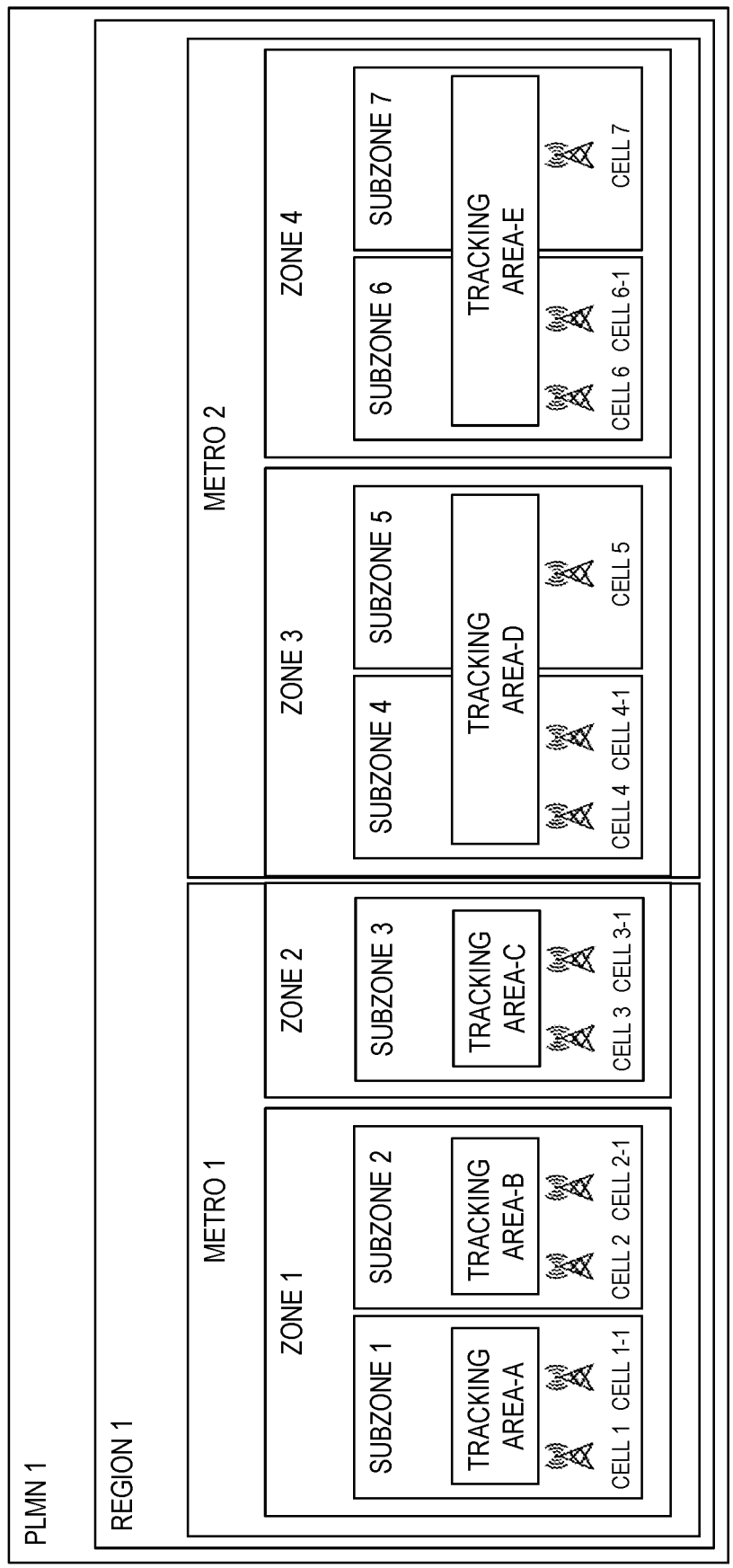
FIG. 2 is a diagram of example of Coverage Area hierarchy together with links to Tracking Areas and Cells.

Through the model 100, we already achieve tracking area decomposition from a whole PLMN all the way to each zone, and when applicable, to active base station that contains an actual gNB or a DU running at the base of the site itself. Finally, the Cell entity is a representation of a cell tower with one of more Radio Units (RU). Each have a mandatory relation to a single Sub Zone. This allows instant resolution of a) Cell-Tracking Area association and b) location of gNB-DU serving each cell. Between the recursive Coverage areas and a Tracking Area/Cell overlay, a simple yet effective abstraction of the mobile network is achieved. FIG. 2 is a diagram of example of Coverage Area hierarchy together with links to Tracking Areas and Cells.

For the data centers 104, this is a generalized model that is used to represent any physical or discrete data center. Each data center is associated with a Coverage Area, and by that becomes an available location for its Network Function or any child Area's functions. This group of entities covers the physical infrastructure. Discrete Datacenters represent physical and virtual Datacenters. Physical DCs are geolocated, on-premises DCs that run their own clusters while virtual DCs stand for cloud zones. Subnet information for a DC is captured in the Subnet table. Cluster represents a cluster of nodes where compute represent the individual nodes within a cluster. Node groups are the mechanism to tag different portions of a cluster to different Subnets and accordingly make it available in different DCs. That means a cluster can be associated with nodes from multiple DCs. DCs have a relationship to Coverage Areas For the transport network 106, this model is a heavy abstraction of the Transport network connectivity. Its intention is to simply capture the potential Layer 3 KPIs for a candidate inter-datacenter connectivity. This part of the model focuses on entities to support transport network orchestration, like Provider Edge Router (PE), Gateway Router and Data Network. Engineered Path represents any transport path that exists between two PE Routers along with its capacity information, latency, throughput and jitter. It represents the expected outcome and KPIs between each two Edge Routers tagged to a Subnet and therefore part of a DC, if we tried to interconnect them using an Segment Routing Traffic Engineering (SRTE) or any tunneling technology with a L3 Virtual Private Network (VPN) on top of it. The gateway routers feed into the backbone and provide the required link to the Data network. This group of entities are linked primarily to the Datacenter section of the model. The relationship between PE routers and Subnets provides that link.

For the vendor information 108, to allow for the highest level of data-driven orchestration, yet a multi-vendor Network Slice Subnet Management Function (NSSMF), the Service Provider is required to provide the different mobile vendor xNF availability for each Data Center's Location. The vendor section gives information about vendors, their types (RAN, Core, transport network), their supported xNF list and what technology is used for the xNF deployment. It is linked to DCs and Clusters. A vendor supports one or more clusters and operates one or more Data Centers. It is an enabling foundation for dynamic generation of xNF vendor specific resource orchestration data. Such data will contain all the relevant information for automated deployment, day 2 configuration and dynamic resolution of xNF parameters.

This model supports a dynamic multi-vendor construct and therefore depending on the location of any xNF that needs to be deployed, then a certain type of xNF can be supported by a specific vendor operating this location with a different deployment mechanism and a different set of generated deployment and configuration data associated with it. This way any solution consuming this model becomes vendor aware. Therefore, capable of achieving fully dynamic orchestration while remaining model-driven.

For the policy configuration 110, with this single entity, the Service Provider gets to define its rules for each Slice/Service type with regards to:
 (a) xNF Type allowed Data Center type, and
 (b) xNF Type Shareability rule.

The policy configuration 110 in the model 100 allows the definition of policy level constraints that will influence the dynamic deployment of NFs. Examples can include the definition of a concrete list of xNFs for a certain PLMN and further limits the choice of Data Center where xNF are being placed. Policy is defined only at the PLMN Coverage Areas level.

This vendor topology model 100 contains information that covers physical network, vendor information, network infrastructure and user defined policy, all interleaved together to provide the foundation for dynamic placement of Network Function and furthermore to allow autonomous Network Slice and application orchestration, starting from the design phase and spanning all the way till slice fulfillment, xNF deployment, resource orchestration and discovery. It facilitates the automatic deployment of services across multiple sites and multiple clouds, based on a wide variety of constraints including platform capabilities, capacity, location and other service specific parameters.

Relationships Between the Domains

Again, the information model 100, through its abstraction and normalization, brings together the domains 102, 104, 106, 108, 110 that are natively unaware of each other. Beyond just the simple point of inter-domain awareness, there is a precise and meticulous design of touchpoint between the entities 112 of the different domains. These are the characteristics that make traversing the entities 112 of this model 100 optimal and smooth. Hence enables it to be a foundational cornerstone for Network Function placement across 5GC, RAN, and Edge applications that is optimized, multi-site, intent- and policy-based and is well tailored to operate in a closed-loop environment. This model 100 introduces a single point of reference that encapsulates and maintains all the capabilities and required information from various data sources to serve as an apparatus for several network slicing related applications including, but not limited to, enabling a diversity of Placement algorithms with multitude of constraints that can be used to achieve optimal location selection. It is also able to support Service Qualification, Feasibility and Capacity analysis as well as Service Assurance.

The domains 102, 104, 106, 108, 110 are interlocked together through relationships between the entities 112 which forms the foundation in establishing the connections between the domains and enabling the overlay, execution, and enforcement of any business rules applicable.

The following describes relationships between the domains 102, 104, 106, 108, 110 and their entities.

Mobile Access Network recursivity: The recursively of Coverage Areas provides the Operator the means to control the orderable area of service from the largest to the smallest granularity. Although Coverage Area is a business construct, it is also positioned as the mapping entity between two critical Network entities: Cell sites and Tracking Area. Having such relationship replaces the traditional Cell/TA association, enabling the following:
 (1) Allow only a subset of a tracking area to be independently orderable, and
 (2) Allow the orderable area to be as small as a single cell site (only when the targeted cell site has the capability to be network orchestrated)

These two objectives are met without compromising or requiring additional association between Tracking Area and Cell. Such approach removes the need to maintain and assure multi-source alignment between business and network data, since any readjustment to Tracking Area definition (adding or removing cell sites) will have its impact on the orderable coverage areas instantly reflected by this model 100.

Moreover, addressing sub-Tracking Area and cell site service orderability is something that standards (3GPP and GSMA) have not been able to easily enable. This has been raised as a major concern by Service Providers who need to achieve new 5G service granularity without having to redefine their existing Network RAN infrastructure.

Data Centers interlock: Although the Data Centers are modelled using a generic representation which normalizes on-premises as well as a cloud-based infrastructure, this model 100 provide three facets:
 (1) Physical: represented by the Discrete Data Center entity representing the physical infrastructure.
 (2) Logical: Logical Cluster that have presence within this physical datacenter as well as Node Group representing a logical grouping of compute being the subset of the cluster present within this data center.
 (3) Networking: The Subnet entity is acting as a mapping entity, that anchors the logical Node Group within the physical infrastructure and also maps it to a potential set of Transport Network connectivity. While the data center domain's information model is generic, the actual novelty resides in how its entities communicate to adjacent domain's model: the Mobile Access, Vendor and Transport, making it the nucleus that interlocks those domains. Such approach allows a continuous analysis for achieving dynamic placement, feasibility, and capacity across a multi-dimension decision matrix with those dimensions being: NFV availability, Networking performance predictability, and Market coverage.

Multi-vendor Network Function Virtualization (NFV) Availability: This concept goes beyond the traditional management and orchestration (MANO) resource orchestration that relies primarily on available and utilized Data Center/compute capacity. Instead, relations with Vendor entity provides insight into the true capability of the datacenters. This is exposed by two relations:
  (1) Direct relation between DC and Vendor entity: Allowing any process to holistically assess the capability of a datacenter to accommodate certain types of Network Functions from a specific vendor, and
  (2) Deployment method: Each Vendor entity defines a specific NFV orchestration mechanism that this vendor supports. At the same time each Cluster entity has a list of supported Network Function Virtualization Orchestration (NFVO) that can be used as deployers. The affinity between vendor and cluster provides additional validation that the selected cluster/node group does not only support the vendor Network function deployment mechanism, but also the orchestrated Network Function will have access to the proper networking allowing it to interconnect to required external Network Functions (on a different cluster of the same datacenter, or on different or same cluster of another datacenter) in order to achieve the desired service chain.

These two relationships allow to instantaneously assess the capability of data center to host a specific Network Function type, as well as which Clusters, exposed by some Node Groups within this datacenter, provides the deployability of this VNF Networking performance predictability: Although physical data center connectivity is critical, it is definitely not enough to achieve fully automated decision for xNF resource orchestration. The association introduced by this model 100 between the different Transport's Engineered Path and the Data Center's Subnet via different PE routers, provides immediately a way to determine which set of resources within a Data Center available on which logical cluster has access to the proper Transport infrastructure with the potential to deliver the expected interconnectivity KPIs.

Market Coverage: Data Centers are of different types (Local, Edge, Regional, National) which predict their size, compute cost, coverage and reach. Therefore, attaching each Data Center to a specific instance within the Coverage Areas hierarchy, allows a process to determine the purpose they can have within the service chain. In the example of a point-to-multipoint 5G Network Slice, we need to consider the following set of Network Functions:

Core Control Plane Functions would be positioned in Data Centers that can service the largest possible Coverage Area. This will reduce compute cost, minimize the number of deployments, and allow shareability across the largest number of slices.

Core User Plane Function: Being a single instance for a slice, it will dictate overall coverage of a slice, therefore a placement or optimization algorithm will face one of three possibilities:
  (1) A Distributed Data Center (DDC) serving the requested target Coverage Area is identified. By identified we mean: has a cluster capable of the vendor xNF, has the compute capacity and affinity, and the required connectivity to each Access function across this area within the required transport KPIs.
  (2) A DCC serving the broader (parent) Coverage Area is identified.
  (3) Multiple DCCs serving smaller (child) Coverage Areas are identified While both options (1) and (2) provide valid Service/Slice design options, the final decision is business centric driven by cost, scarcity of resources and future growth projection. Such decision can be automated or pushed to the consumer for a manual scrutinization. On the other hand, option (3) is invalid, and it should lead to either discarding the request or, if implementation allows, disaggregating the Service request into multiple smaller Slice requests.

Access Network Functions: Those are fundamentally different than Core function since Access Functions are easier to scale and geographically distributable. Therefore, their position can vary from a single DCC attached to the targeted Coverage Area to DCCs of multiple child Coverage Areas and with that moving them closer to the User, hence, multiplying their instance number, increasing the cost per instance (edge compute being scarce), and simultaneously improving access and front-haul and mid-haul performance while compromising backhaul performance.

In summary, a process is capable of determining the true availability of compute sets (cluster/node group) within a Data Center that are eligible for a specific VNF (type and vendor) and confirms its compatibility, while guaranteeing the network connectivity and predicting the performance of several Logical connection options as well as continuously optimizing it for the market coverage required by such service chain design. Hence, this model 100 can be leveraged to easily reach intelligent network slicing decisions that are otherwise very lengthy and complex to achieve.

Model Use

The model 100 can be used by an orchestration system or the like to provide Zero Touch 5G orchestration. For example, a new network slice is requested in a specific coverage area. As part of the network slice fulfillment, the RAN needs to be configured in order to support this new Slice. An orchestration system can use the model 100 to resolve the problem by providing:
  (1) List of Tracking Areas
  (2) List of Cell Sites
  (3) Location for a new Centralized Unit (CU) to be deployed dedicated to the network slice.

Using the model 100, here are the steps that need to be followed:
  (1) From the requested Coverage Area decompose into its child Coverage Areas based on Mobile Access Network Recursivity. This will result in a multi-level containment tree.
  (2) For every leaf of this tree, resolve the target Tracking Area (1) as well as the Cell Sites (2). Also, association between Tracking Area and Cell sites can be obtained at this point.
  (3) For every child Coverage Area in this tree, obtain all Data Centers contributing to its Market Coverage.
  (4) From this list of Data Centers, using the Subnet and Node Group relation, locate each Distributed Unit (DU).
  (5) At this point we have a list of DUs that are servicing all the Cell sites of the requested Coverage Area, as well as their location.
  (6) From the Subnet of each Node Group hosting a DU, find all Engineered Paths with KPI meeting the Slice Service Level Agreements (SLAs) (Networking performance predictability).
  (7) Using those eligible Engineered Paths, we can obtain all potential target Datacenters for the CU. At this point a ranked list of target Datacenters is generated. This list contains only Datacenters that are a valid candidate for all DUs in the list. Ranking can be done based on Datacenter position within hierarchy (lowest compute cost for larger datacenter and further from Network Edge) or any other business or network criteria.

(8) Find the highest ranked Data Center that has a Node Group which is of Cluster that supports the Vendor of choice for the CU to be deployed (Multi-vendor NFV Availability).

Example Processing Device Architecture

Figure 3:
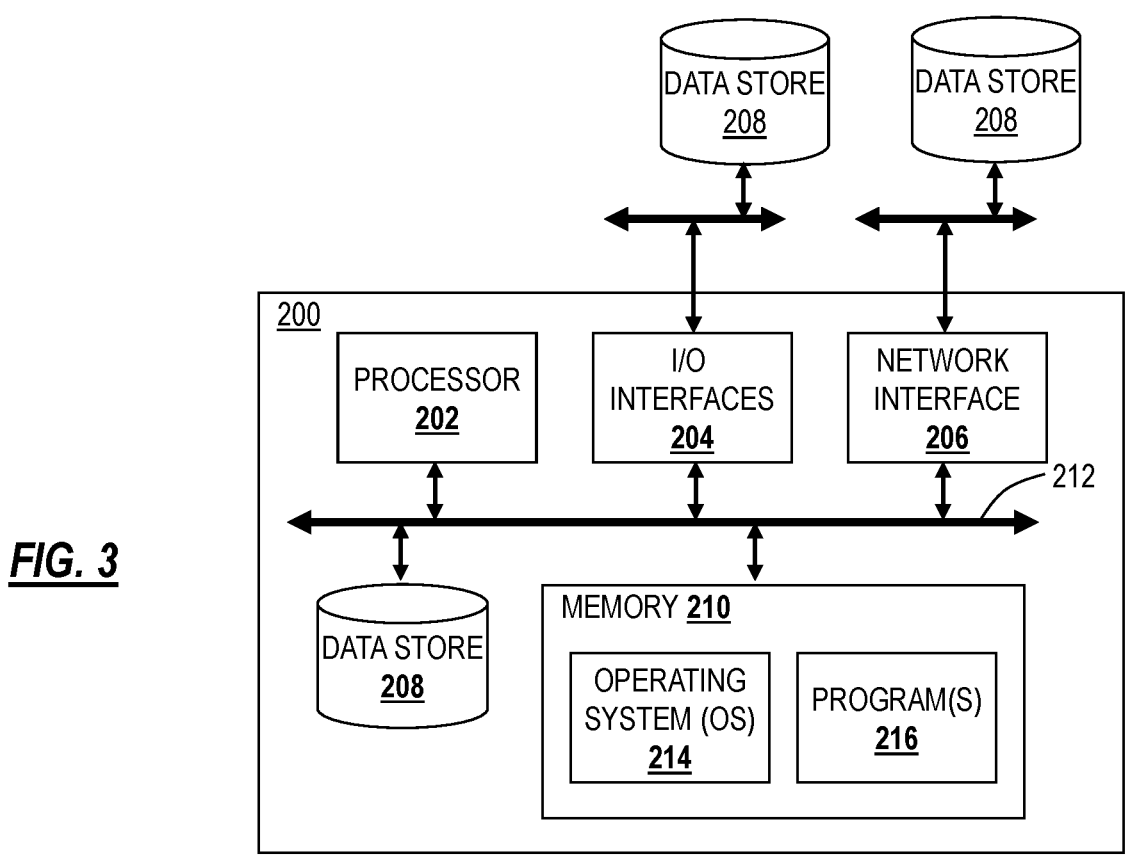
FIG. 3 is a block diagram of a processing device.

FIG. 3 is a block diagram of a processing device 200. The processing device 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the processing device 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory 210, to communicate data to and from the memory 210, and to generally control operations of the processing device 200 pursuant to the software instructions. The I/O interfaces 204 may be used to receive user input from and/or for providing system output to one or more devices or components.

The network interface 206 may be used to enable the processing device 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the processing device 200, such as, for example, an internal hard drive connected to the local interface 212 in the processing device 200. Additionally, in another embodiment, the data store 208 may be located external to the processing device 200 such as, for example, an external hard drive connected to the I/O interfaces 204 (e.g., SCSI or USB connection). In a further embodiment, the data store 208 may be connected to the processing device 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Process

Figure 4:
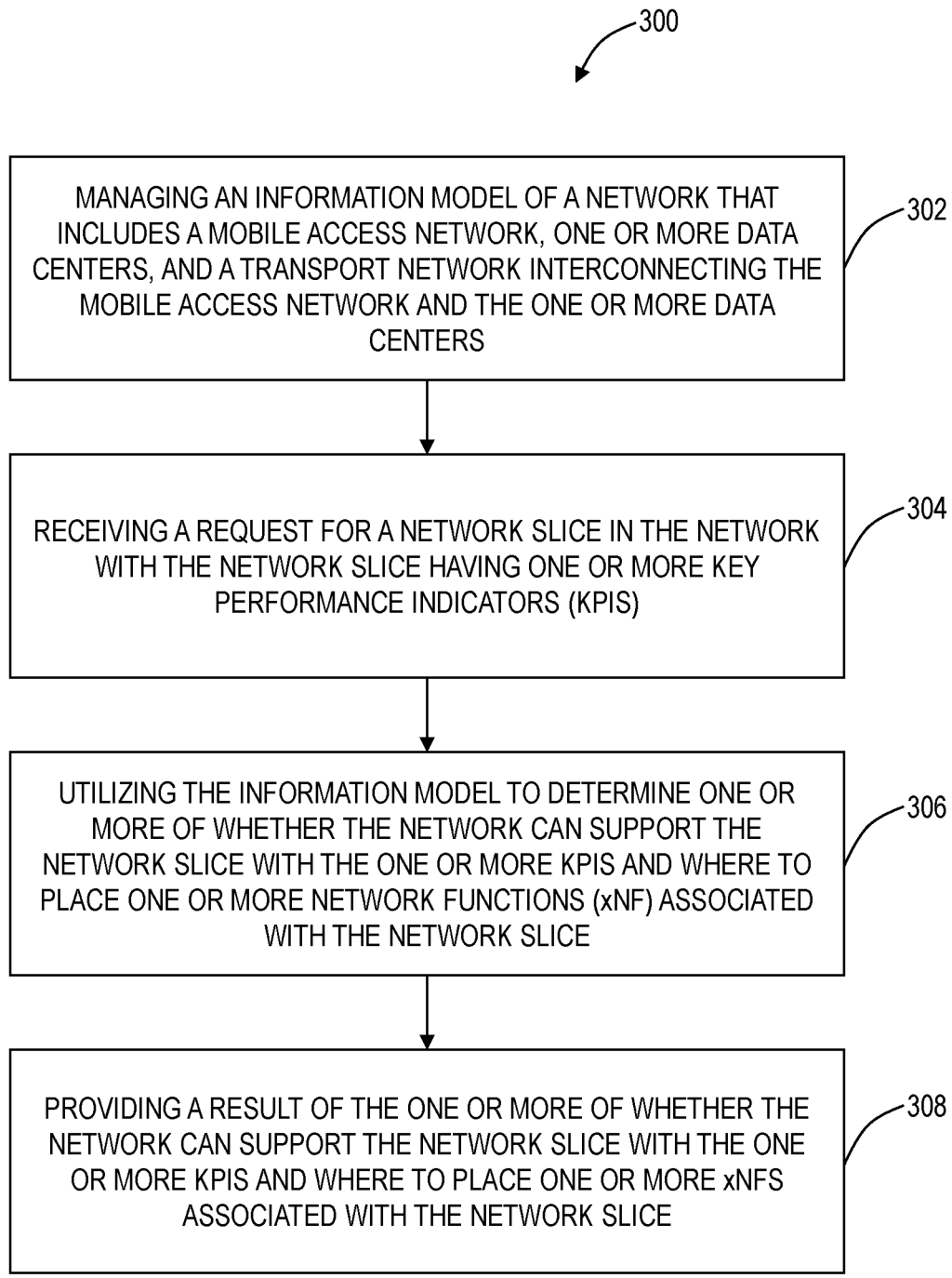
FIG. 4 is a flowchart of a process for utilizing a multi-domain topology model for dynamic orchestration of network functions.

FIG. 4 is a flowchart of a process 300 for utilizing a multi-domain topology model for dynamic orchestration of network functions. The process 300 contemplates using the information model 100, such as to answer questions related to where a given NF should be placed to support a new network slice. The process 300 contemplates implementation as a method having steps, via the processing device 200 configured to implement the steps, and as a non-transitory computer-readable medium storing instructions that, when executed, cause one or more processors to implement the steps.

The steps of the process 300 include managing an information model of a network that includes a mobile access network, one or more data centers, and a transport network interconnecting the mobile access network and the one or more data centers (step 302); receiving a request for a network slice in the network with the network slice having one or more Key Performance Indicators (KPIs) (step 304); utilizing the information model to determine one or more of whether the network can support the network slice with the one or more KPIs and where to place one or more Network Functions (xNF) associated with the network slice (step 306); and providing a result of the one or more of whether the network can support the network slice with the one or more KPIs and where to place one or more xNFs associated with the network slice (step 308).

The managing the information model can include obtaining data from the mobile access network, the one or more data centers, and the transport network, including vendor information associated with each; obtaining policy configuration that defines rules for network slices; and incorporating a subset of the data and the policy configuration into the information model, wherein the subset includes the data required to support xNF instantiation and placement. The incorporating includes abstracting and normalizing the subset of the data into the information model. The subset includes minimal required data to support the xNF instantiation and placement, such that the information model is a unified model across the mobile access network, the one or more data centers, and the transport network. The policy configuration includes which types of xNFs the one or more data centers support and shareability of the xNFs between users.

The process 300 further includes causing zero touch orchestration of the network slice based on the result. The information model includes a plurality of entities for the mobile access network, the one or more data centers, and the transport network, and an entity each for vendor information and for policy configuration, and wherein the information model includes defined relationships between each of the entities. The information model for the mobile access network includes Coverage Area, Cell, and Tracking Area, and wherein the information model supports an orderable area of service to a granularity of a cell site.

As described herein, zero-touch orchestration means an automated process whereby orchestration of a network slice is performed, subsequent to the request and the results from the information mode, without the need for human intervention.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections may include headers for various embodiments and those skilled in the art will appreciate these various embodiments may be used in combination with one another as well as individually. Further, it is noted that the various elements, operations, steps, methods, processes, algorithms, functions, techniques, etc. described herein can be used in any and all combinations with one another.

What is claimed is:

1. A non-transitory computer-readable medium comprising instructions that, when executed, cause one or more processors to perform steps of:
   managing an information model of a network that includes a mobile access network, one or more data centers, and a transport network interconnecting the mobile access network and the one or more data centers;
   receiving a request for a network slice in the network with the network slice having one or more Key Performance Indicators (KPIs);
   utilizing the information model to determine one or more of whether the network can support the network slice with the one or more KPIs and where to place one or more Network Functions (xNFs) associated with the network slice; and
   providing a result of the one or more of whether the network can support the network slice with the one or more KPIs and where to place the one or more xNFs associated with the network slice.

2. The non-transitory computer-readable medium of claim 1, wherein the managing the information model includes
   obtaining data from the mobile access network, the one or more data centers, and the transport network, including vendor information associated with each;
   obtaining policy configuration that defines rules for network slices; and
   incorporating a subset of the data and the policy configuration into the information model, wherein the subset includes second data required to support xNF instantiation and placement.

3. The non-transitory computer-readable medium of claim 2, wherein the incorporating includes abstracting and normalizing the subset of the data into the information model.

4. The non-transitory computer-readable medium of claim 2, wherein the subset includes minimal required data to support the xNF instantiation and placement, such that the information model is a unified model across the mobile access network, the one or more data centers, and the transport network.

5. The non-transitory computer-readable medium of claim 2, wherein the policy configuration includes which types of xNFs the one or more data centers support and shareability of the xNFs between users.

6. The non-transitory computer-readable medium of claim 1, wherein the steps further include;
   causing zero touch orchestration of the network slice based on the result.

7. The non-transitory computer-readable medium of claim 1, wherein the information model includes a plurality of entities for the mobile access network, the one or more data centers, and the transport network, and an entity each for vendor information and for policy configuration, and wherein the information model includes defined relationships between each of the plurality of entities.

8. The non-transitory computer-readable medium of claim 7, wherein the information model includes interlocking between entities of the plurality of entities for the one or more data centers and entities of the plurality of entities for the mobile access network, the transport network, vendor information, and policy configuration.

9. The non-transitory computer-readable medium of claim 1, wherein the information model for the mobile access network includes Coverage Area, Cell, and Tracking Area, and wherein the information model supports an orderable area of service to a granularity of a cell site.

10. The non-transitory computer-readable medium of claim 1, wherein the information model includes Coverage Area which is recursively decomposed to model an area of the mobile access network.

11. A method comprising steps of:
managing an information model of a network that includes a mobile access network, one or more data centers, and a transport network interconnecting the mobile access network and the one or more data centers;
receiving a request for a network slice in the network with the network slice having one or more Key Performance Indicators (KPIs);
utilizing the information model to determine one or more of whether the network can support the network slice with the one or more KPIs and where to place one or more Network Functions (xNFs) associated with the network slice; and
providing a result of the one or more of whether the network can support the network slice with the one or more KPIs and where to place the one or more xNFs associated with the network slice.

12. The method of claim 11, wherein the managing the information model includes;
obtaining data from the mobile access network, the one or more data centers, and the transport network, including vendor information associated with each;
obtaining policy configuration that defines rules for network slices; and
incorporating a subset of the data and the policy configuration into the information model, wherein the subset includes second data required to support xNF instantiation and placement.

13. The method of claim 12, wherein the incorporating includes abstracting and normalizing the subset of the data into the information model.

14. The method of claim 12, wherein the subset includes minimal required data to support the xNF instantiation and placement, such that the information model is a unified model across the mobile access network, the one or more data centers, and the transport network.

15. The method of claim 12, wherein the policy configuration includes which types of xNFs the one or more data centers support and shareability of the xNFs between users.

16. The method of claim 11, wherein the steps further include:
causing zero touch orchestration of the network slice based on the result.

17. A processing device comprising:
one or more processors and memory storing instructions that, when executed, cause the one or more processors to:
manage an information model of a network that includes a mobile access network, one or more data centers, and a transport network interconnecting the mobile access network and the one or more data centers,
receive a request for a network slice in the network with the network slice having one or more Key Performance Indicators (KPIs);
utilize the information model to determine one or more of whether the network can support the network slice with the one or more KPIs and where to place one or more Network Functions (xNFs) associated with the network slice; and
provide a result of the one or more of whether the network can support the network slice with the one or more KPIs and where to place the one or more xNFs associated with the network slice.

18. The processing device of claim 17, wherein, to manage the information model, the instructions that, when executed, further cause the one or more processors to:
obtain data from the mobile access network, the one or more data centers, and the transport network, including vendor information associated with each,
obtain policy configuration that defines rules for network slices, and
incorporate a subset of the data and the policy configuration into the information model, wherein the subset includes second data required to support xNF instantiation and placement.

19. The processing device of claim 17, wherein the instructions that, when executed, further cause the one or more processors to causing zero touch orchestration of the network slice based on the result.

20. The processing device of claim 17, wherein the information model includes a plurality of entities for the mobile access network, the one or more data centers, and the transport network, and an entity each for vendor information and for policy configuration, and wherein the information model includes defined relationships between each of the plurality of entities.

* * * * *